Patented June 8, 1948

2,442,958

UNITED STATES PATENT OFFICE 2,442,958

POLYAMIDES OF TRIMETHYLADIPIC ACID

Rupert C. Morris and Hans Dannenberg, Berkeley, and Harry de V. Finch, El Cerrito, Calif., assignors to Shell Development Company, San Francisco, Calif., a corporation of Delaware No Drawing. Application June 12, 1944,
Serial No. 539,992

9 Claims. (Cl. 260—78)

This invention relates to polyamides.

Polyamides can be obtained from monoamino-monocarboxylic acids or amide-forming derivatives thereof, or from mixtures of diamines with dicarboxylic acids or amide-forming derivatives thereof by heating the reactants under condensation polymerization conditions. As the condensation progresses, the molecular weight of the polyamides increases. Polyamides of relatively low molecular weight may be suitable for molding but are not fiber-forming. Higher molecular weight polyamides may be fiber-forming. The strength of the fibers may be increased by cold-drawing.

Available fiber-forming polyamides have several disadvantageous properties. They are relatively insoluble in volatile liquids, are subject to decomposition at the melting point in contact with air, and so must be spun from the melt under an inert gas such as nitrogen. When an attempt is made to produce felt from a suitably carded mass of fibers containing cold-drawn polyamide fibers by heating in air to cause contraction, with accompanying felting action, of the cold-drawn fibers, it is found that the polyamide fibers decompose without contracting.

While the polyamides can be subjected to compression and injection molding, the high temperatures required and the sharp melting point of the material make necessary the use of special equipment and of extraordinary skill.

An object of the present invention is the production of improved polyamides. Another object is the production of amides useful in the production of resinous polymeric condensation products. Other objects will be apparent from the description of the invention given hereinafter.

These objects are accomplished in accordance with the present invention by the production of polyamides from trimethyladipic acids or amide-forming derivatives thereof by heating under condensation polymerization conditions with suitable diamines, particularly with diamino trimethylhexanes. The branch-chain amide-forming reactants have been generally considered markedly inferior to straight-chain reactants for the production of polyamides. It has been discovered that trimethyladipic acids may be used in the production of polyamides which are actually superior to the usual polyamides in the ease with which they may be extruded, and after-worked. The new polyamides are remarkable in that they are fiber-forming and as well lend themselves to compression and injection molding in ordinary equipment by known methods.

The trimethyl adipic acids used in the production of these new substances can be represented by the general structural formula

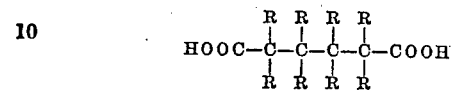

wherein three of the R's each represent a methyl radical, the remaining R's representing hydrogen. The trimethyl adipic acids may be produced by known methods of synthesis. A preferred method comprises the oxidation of cyclohexyl alcohols or ketones with nitric acid or the like. The oxidation of a trimethylcyclohexanone or a trimethylcyclohexanol such as 2,2,4-trimethylcyclohexanone, 2,2,4-trimethylcyclohexanol, 3,3,5-trimethylcyclohexanone or 3,3,5-trimethylcyclohexanol yields a mixture of isomeric trimethyl adipic acids including the following:

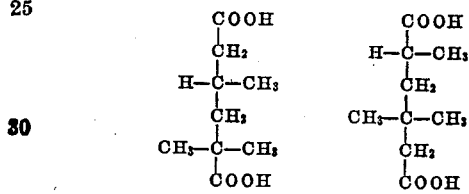

The oxidation may be facilitated by the presence of oxygen-transfer agents such as mercuric oxide, molybdenum pentoxide, vanadium pentoxide or the corresponding salts. In the oxidation of the cyclic compounds small amounts of other acids, particularly other dicarboxylic aliphatic acids, may be produced. These other acids may or may not be separated from the mixture of isomeric trimethyl adipic acids. The latter isomers may or may not be separated from one another; in fact, by virtue of the ease and economy of their production and of the unusual and desirable character of the products, it is desirable to employ in the production of the polyamides of the invention a mixture of isomeric trimethyl adipic acids in the proportions in which they are produced by the nitric acid oxidation of a cyclohexanol such as 3,3,5-trimethylcyclohexanol, the by-products being preferably removed.

While it is preferred to use only one or more trimethyladipic acids or amide-forming derivatives thereof as acid reactants, other dicarboxylic acids or their amide-forming derivatives may be used in admixture therewith, if desired. Particularly valuable for this purpose are the dicarboxylic acids of the formula

$$HOOC-CH_2-R-CH_2-COOH$$

in which R is a divalent hydrocarbon radical free from olefinic and acetylenic unsaturation, R being preferably $(CH_2)_n$, in which $n$ is an integer. Examples of suitable acids are glutaric, adipic, beta-methyladipic, pimelic, suberic, azelaic, undecandioic, 1,2-cyclohexanediacetic, paraphenylene diacetic, etc. acids. Lower acids may be used, including carbonic, oxalic, malonic and the like.

Suitable diamine reactants include compounds of the formula

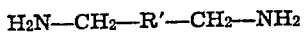

$$H_2N-CH_2-R'-CH_2-NH_2$$

wherein R' is a divalent hydrocarbon radical free from olefinic and aectylenic unsaturation, R' being preferably $(CH_2)_{n_1}$ in which $n_1$ is an integer of at least 2. Examples of diamines of the designated formula are tetramethylenediamine, pentamethylenediamine, hexamethylenediamine, octamethylenediamine, decamethylenediamine, paraxylenediamine, 3-methyl-hexamethylenediamine, etc. Lower amines such as ethylenediamine may be used. Mixtures of amines may be used.

It has been discovered that, contrary to expectation, particularly suitable diamine reactants are diamino trimethylhexanes, which have the formula

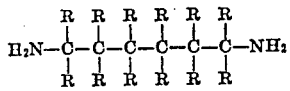

wherein three of the R's each represent a methyl radical, the remaining R's representing hydrogen. The diamino trimethylhexanes may be produced by known methods of synthesis. A preferred method comprises their production from the corresponding trimethyladipic acids. For instance, the acids may be reacted with ammonia in the presence of an orthophosphoric acid ester catalyst, forming the nitriles, which may then be converted to the amines by hydrogenation. Other methods of production may be used. It is desirable to employ diamines corresponding in structure and in proportion to the trimethyladipic acids used. Thus, with a mixture of alpha,alpha,-beta'-trimethyl-adipic acid and alpha,beta',beta'-trimethyl-adipic acid there may be used a mixture of 1,6-diamino-1,1,5-trimethylhexane and 1,6-diamino-1,5,5-trimethylhexane in corresponding proportions. Nevertheless, satisfactory results may be obtained with different proportions, or by the use of a single diaminotrimethylhexane with a mixture of trimethyl-adipic acids, or by the use of a single trimethyl-adipic acid with a mixture of diaminotrimethylhexanes.

Instead of the preferred reactants designated hereinbefore there may be employed dibasic acids and diamines either or both of which contain one or more "hetero" atoms, particularly "hetero" atoms of the oxygen family, especially oxygen itself. An "hetero" atom, as used herein, is an atom other than carbon which appears in the chain of atoms separating the reactive groups. Reactants containing carbon-to-carbon unsaturation may be employed. Reactants having more than two reactive groups, i. e. carboxyl and/or amino groups, may be used. Aminocarboxylic acids may be present.

The acid and amine reactants are preferably used in substantially chemically equivalent amounts. Diamines and dibasic acids should be present in substantially equimolecular proportions. For best results not more than 5 molar percent excess of either reactant is employed.

The first reaction which occurs when a diamine and a dicarboxylic acid are mixed and brought into sufficiently intimate contact is the formation of the diamine-dicarboxylic acid salt. It is often desirable to separate and to purify the salt prior to its conversion into the polyamide. The salt is generally crystalline and readily purified by recrystallization from a suitable solvent. The crystalline salt has a definite composition. The separation of the salt affords an automatic means for adjusting the amine and acid reactants to substantial equivalency. Formation and purification of the salt also tend to eliminate impurities which may be present in the original diamine and dibasic acid.

The conversion of the salt to the polyamide may be carried out by heating at amide-forming temperatures, generally between about 180° C. and 300° C., in the presence or absence of a diluent and under conditions which will permit the water formed in the reaction to escape at least during the last stages of the reaction. The reaction is continued preferably until the polyamide has fiber-forming properties. The first stage of the reaction may be carried out in the presence of water.

The polymerization reaction whereby the polyamides of this invention are made may be carried out at atmospheric, superatmospheric or reduced pressure. The last stages of the reaction at least should be carried out under conditions which permit the escape of the by-product of the reaction viz. water in the case of the reaction of diamines with dicarboxylic acids. This may be accomplished by operating at atmospheric or preferably reduced pressures during the last stages of the reaction. The reaction is carried out preferably in the absence of oxygen, e. g. in an atmosphere of nitrogen or of another inert gas or in a vacuum. Anti-oxidants may be present if desired. While it is usually unnecessary to add a catalyst, inorganic materials of alkaline reaction. such as oxides and carbonates and acidic materials such as halogen salts of polyvalent elements, e. g. aluminum and tin, are sometimes helpful.

The products obtained by reacting trimethyladipic acids with diamines are linear polyamides of high molecular weight. Upon hydrolysis with a strong mineral acid, e. g. hydrochloric acid, they revert to the acids and amines from which they were derived. Polyamides can be produced in a wide range of viscosity. In some cases the intrinsic viscosity is as low as 0.3. Preferred for use in fibers as well as in molding are polyamides having an intrinsic viscosity above about 0.4, more preferably above about 0.6.

The polyamides of the invention are characterized by their solubility in a wide range of common solvents. In general the polyamides are soluble in such solvents as alcohols, ketones, ethylene chlorohydrin, dioxane, ethers of ethylene glycol, mixtures of alcohols with aromatic hydrocarbons and mixtures of alcohols with chlorinated hydrocarbons, e. g. alcohol-chloroform mixtures, They are also soluble in formic acid and phenol. Many of the above-designated compounds are solvents only at elevated temperatures.

Polyamides of the invention are characterized by their fiber-forming properties, i. e. their ability to be formed into filaments which can be cold-drawn. One method of producing the filaments comprises dissolving the polyamides in a suitable solvent and extruding the solution through an orifice into a liquid which dissolves the solvent but not the polyamide. Another method consists in extruding a solution of the polyamide into a heated chamber where the solvent is removed by evaporation. Still another method consists in extruding the molten polyamide through an orifice into the atmosphere or into a cooling liquid such as water. By similar processes the polyamides can be formed into rods, sheets, foils, ribbons, films and the like. In various methods of forming shaped articles from the polyamides the characteristics of the articles may be altered by blending with other polyamides with other plasticizers or with plasticizers, solvents, pigments, dyes, delustrants, lubricants, stabilizers, etc.

The filaments may be cold-drawn, a process which improves their strength and elasticity. In general, it is desirable to cold-draw to an extent such that the cold-drawn product has a length between 150% and 500% of the length of the undrawn filament. Ribbons, sheets, foils, filaments and the like may be similarly cold-drawn or may be cold-rolled, which also increases the strength and elasticity of the material.

The following examples are illustrative of the many methods of the preparation and application of the products of the invention.

Example I 3,3,5-trimethylcyclohexanone was oxidized to trimethyladipic acids. A mixture containing about 75% of alpha,alptha,beta'-trimethyladipic acid and about 25% of alpha,beta',beta'-trimethyladipic acid was obtained and purified by fractional distillation under reduced pressure.

A solution of 135.2 grams of the trimethyladipic acids in 650 cc. of absolute alcohol was mixed with a solution of 80.8 grams of freshly distilled hexamethylenediamine in 450 cc. of absolute alcohol. The mixture was seeded with crystals of hexamethylenediammonium trimethyladipate from a preceding experiment and kept in an ice box for 7 days. The crystals which formed were separated by filtration. A second and third crop of crystals were obtained by evaporation of the mother liquor in vacuo. The material was recrystallized from boiling alcohol. The purified material melted at about 184° C.

Hexamethylenediammonium trimethyladipate, 10.5 grams, was heated in a stream of nitrogen in accordance with the following schedule:

1 hour at 100° C. to 200° C. at atmospheric pressure
3 hours at 200° C. to 225° C. at atmospheric pressure
1.5 hours at 225° C. at atmospheric pressure
9 hours at 225° C. at 0.5 mm. pressure.

The product was a pale yellow transparent resin at room temperature. It displayed great strength and toughness. When the molten resin was allowed to solidify in contact with glass a strong resin-glass bond was formed.

The intrinsic viscosity of the resin was 0.553. The resin was swollen by acetone, chloroform and mesityl oxide at room temperature. It formed a rubbery gel in boiling mesityl oxide and dissolved in hot phenol. A continuous thread was spun from the surface of the molten resin at between 150° C. and 200° C. The thread was cold-drawn in the usual manner, whereby the strength was greatly increased. When heated to 55° C. to 60° C. the cold-drawn thread retracted to its original length. Continuous cold-drawn threads could be cut into staple fibers. A mixture of these staple fibers with cotton fibers or other conventional textile or synthetic fibers, carded and worked on a felting machine, could be felted by treating with steam, or by contact with heated solid surfaces, whereby the polyamide fibers contract, exerting felting action.

Other polyamides are produced similarly by reacting trimethyladipic acids with ethylenediamine, tetramethylenediamine, pentamethylenediamine, hexamethylenediamine, octamethylenediamine, decamethylenediamine, and paraxylenediamine.

Example II

A mixture of isomeric trimethylhexamethylenediamines was produced from a mixture of isomeric trimethyladipic acids obtained by the oxidation of 3,3,5-trimethylcyclohexanone. The acids were treated with gaseous ammonia in the presence of a phosphate catalyst, the resulting nitriles being then hydrogenated over Raney nickel in liquid ammonia.

A solution of 15.8 grams of the mixture of diamines in 80 cc. of absolute alcohol was mixed with 18.8 grams of the isomeric trimethyladipic acids in 95 cc. of absolute alcohol. The solution was seeded and allowed to stand undisturbed for several weeks. The crystallized material was recrystallized from boiling absolute alcohol. The purified crystals comprising the trimethylhexamethylenediammonium trimethyladipate salts melted at 170.5° C. to 171° C.

The crystalline salts were heated in a stream of nitrogen in accordance with the following schedule:

3.5 hours at 195° C. at atmospheric pressure
1.5 hours at 200° C. at atmospheric pressure
2 hours at 225° C. at atmospheric pressure
4 hours at 225° C. at 4 mm. pressure
3 hours at 230° C. at 4 mm. pressure
4 hours at 235° C. at 4 mm. pressure The resulting resin was pale yellow in color, hard and transparent. It could be molded easily at between about 95° C. and about 170° C. It could be spun readily from the melt at 180° C. to 190° C. Continuous filaments spun from the melt and cold-drawn retracted at about 70° C. to 75° C.

The resin was swollen by acetone, chloroform and mesityl oxide at room temperature. It dissolved in boiling chloroform and boiling mesityl oxide.

We claim as our invention:

1. A polymeric reaction product from combining chemically equivalent amounts of trimethyladipic acid and an amine of the general formula $H_2N-CH_2-R-CH_2-NH_2$ wherein R is a divalent hydrocarbon radical selected from the group consisting of alkyl and aryl radicals.

2. A polymeric reaction product from combining chemically equivalent amounts of alpha,-alpha,beta'-trimethyladipic acid and an amine of the general formula $H_2N-CH_2-R-CH_2-NH_2$ wherein R is a divalent hydrocarbon radical selected from the group consisting of alkyl and aryl radicals.

3. A polymeric reaction product from combining a 5 molar percent excess of alpha,beta',beta'-trimethyladipic acid with hexamethylenediamine.

4. A polymeric reaction product from combining a chemically equivalent amount of trimethylhexamethylenediamine with trimethyladipic acid.

5. A trimethylhexamethylenediammonium trimethyladipate.

6. A hexamethylenediammonium trimethyladipate.

7. An amide reaction product from combining a 5 molar percent excess of trimethyladipic acid with an amine of the general formula $$H_2N-CH_2-R-CH_2-NH_2$$

wherein R is a divalent hydrocarbon radical selected from the group consisting of alkyl and aryl radicals.

8. A process for making polyamides comprising heating under polyamide-forming conditions 45 mol% to 55 mol% of an amine of the general formula $H_2N-CH_2-R-CH_2-NH_2$ wherein R is a divalent hydrocarbon radical selected from the group consisting of alkyl and aryl radicals with 55 mol% to 45 mol% of trimethyladipic acid.

9. The reaction product from combining 45 mol% to 55 mol% of an amine of the general formula $H_2N-CH_2-R-CH_2-NH_2$ wherein R is a divalent hydrocarbon radical selected from the group consisting of alkyl and aryl radicals with 55 mol% to 45 mol% of trimethyladipic acid.

RUPERT C. MORRIS.
HANS DANNENBERG.
HARRY DE V. FINCH.

REFERENCES CITED

The following references are of record in the file of this patent:

UNITED STATES PATENTS

| Number | Name | Date |
|---|---|---|
| 2,130,523 | Carothers | Sept. 20, 1938 |
| 2,130,948 | Carothers | Sept. 20, 1938 |
| 2,163,636 | Spanagel | June 27, 1939 |
| 2,310,045 | Thurston | Feb. 2, 1943 |